United States Patent
Synnergren et al.

(10) Patent No.: US 9,474,078 B2
(45) Date of Patent: *Oct. 18, 2016

(54) METHODS AND NODES IN A COMMUNICATION SYSTEM

(71) Applicant: Telefonaktiebolaget LM Ericsson (publ), Stockholm (SE)

(72) Inventors: Per Synnergren, Luleå (SE); Hans Hannu, Luleå (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 165 days.

This patent is subject to a terminal disclaimer.

(21) Appl. No.: 14/532,548

(22) Filed: Nov. 4, 2014

(65) Prior Publication Data

US 2015/0055464 A1  Feb. 26, 2015

Related U.S. Application Data

(63) Continuation of application No. 12/960,945, filed on Dec. 6, 2010, now Pat. No. 8,892,142.

(60) Provisional application No. 61/304,542, filed on Feb. 15, 2010.

(51) Int. Cl.
*H04L 12/28* (2006.01)
*H04W 72/04* (2009.01)
(Continued)

(52) U.S. Cl.
CPC ........ *H04W 72/0486* (2013.01); *H04L 67/325* (2013.01); *H04W 4/00* (2013.01);
(Continued)

(58) Field of Classification Search
CPC ............... H04W 72/0486; H04W 28/0289; H04W 28/26; H04W 4/005; H04W 4/001; H04W 4/00; H04W 72/1252; H04W 28/16; H04L 67/325
See application file for complete search history.

(56) References Cited

U.S. PATENT DOCUMENTS

| 6,820,049 B1 | 11/2004 | Monroe et al. |
| 6,978,217 B2 | 12/2005 | Morozumi et al. |

(Continued)

FOREIGN PATENT DOCUMENTS

| EP | 1077557 A1 | 2/2001 |
| WO | 2010055409 A2 | 5/2010 |

OTHER PUBLICATIONS

3rd Generation Partnership Project. "3rd Generation Partnership Project; Technical Specification Group Services and System Aspects; Service requirements for machine-type communications; Stage 1 (Release 10)." 3GPP TS 22.368, V1.1.1, Nov. 2009, Sophia Antipolis Valbonne, France, pp. 1-23.

(Continued)

*Primary Examiner* — Afshawn Towfighi
(74) *Attorney, Agent, or Firm* — Coats & Bennett, PLLC

(57) ABSTRACT

Embodiments herein include a method in a server for scheduling of an information transmission from an information providing device to a subscriber equipment in a communication system. The method comprises determining a moment in time at which the subscriber equipment desires information. Also, an estimation of the communication intensity in the communication system at the determined moment in time is obtained. If the estimated communication intensity exceeds a certain threshold value, an appropriate period in time for the information providing device to send desired information to the subscriber equipment is calculated, based on the communication intensity in the communication system. Furthermore, a trigger signal is sent to the information providing device, requesting the information providing device at what moment in time to provide information to the subscriber equipment. A method in an information providing device is also disclosed.

15 Claims, 7 Drawing Sheets

(51) Int. Cl.
*H04W 4/00* (2009.01)
*H04L 29/08* (2006.01)
*H04W 28/26* (2009.01)
*H04W 28/02* (2009.01)
*H04W 28/16* (2009.01)
*H04W 72/12* (2009.01)

(52) U.S. Cl.
CPC ........... *H04W 4/001* (2013.01); *H04W 4/005* (2013.01); *H04W 28/0289* (2013.01); *H04W 28/26* (2013.01); *H04W 28/16* (2013.01); *H04W 72/1252* (2013.01)

(56) References Cited

U.S. PATENT DOCUMENTS

| | | | |
|---|---|---|---|
| 7,072,932 | B1 | 7/2006 | Stahl |
| 7,403,839 | B1 | 7/2008 | Kaplan |
| 8,032,123 | B2 | 10/2011 | Sakhpara |
| 8,892,142 | B2* | 11/2014 | Synnergren ............. H04W 4/00 455/509 |
| 2002/0194601 | A1* | 12/2002 | Perkes ................... G06Q 30/02 725/44 |
| 2003/0023638 | A1* | 1/2003 | Weight ................ G06F 17/3089 715/234 |
| 2003/0123422 | A1* | 7/2003 | Miya ....................... H04L 12/24 370/338 |
| 2005/0018617 | A1 | 1/2005 | Jin et al. |
| 2008/0163310 | A1 | 7/2008 | Fingerhut et al. |
| 2009/0243840 | A1 | 10/2009 | Petite et al. |
| 2012/0094705 | A1 | 4/2012 | Kish et al. |

OTHER PUBLICATIONS

KPN. "Contirbution to TS 22.368: proposed Group Specific MTC Devices Trigger Use Case in Annex A and proposed requirement for the Group Based Category in section 7.2.6." 3GPP TSG-SA WG1 Meeting #48, S1-094154, Beijing, China, Nov. 16-20, 2009, p. 1.

\* cited by examiner

METHODS AND NODES IN A COMMUNICATION SYSTEM

RELATED APPLICATIONS

This application is a continuation of U.S. patent application Ser. No. 12/960,945, which was filed on Dec. 6, 2010, and claims the benefit of U.S. Provisional Patent Application Ser. No. 61/304,542, filed Feb. 15, 2010, which is incorporated herein by reference in its entirety.

TECHNICAL FIELD

The present disclosure relates to a server and a method in a server, and to an information providing device and a method in an information providing device. In particular, it relates to scheduling of transmissions from an information providing device to an information subscriber terminal.

BACKGROUND

Packet Switched (PS) data services were introduced in the second generation of mobile networks. Since then, mobile PS data has become a main stream service used in almost all parts of the world.

The latest developments are that mobile broadband via High Speed Packet Access (HSPA) and smart-phones like iPhone and Android phones have become a success. This has increased the load on mobile networks to the extent that it has started to become an issue that needs to be solved.

At the same time the industry is starting to consider Machine-to-Machine (M2M) communication using PS data services. M2M communication have the potential to increase to number of devices in mobile networks around the world from a few billion (~3-4 billion) to tens of billions, maybe 50 billions. This would then further add to the problem with load in the mobile networks.

Some possible features of an M2M system may comprise a device or group of devices capable of replying to requests for data contained within those devices or capable of transmitting data contained within those devices autonomously. Further, a communication link to connect the device or group of devices to a computer server or another device may be provided. This can be a standard ethernet or phone line connection, or a WiFi and/or wireless connection. If using a wireless connection, typically a connected device platform may be comprised to manage the communications link such as e.g. service activations, provisioning, usage controls, fraud management, cost management, etc. Further a software agent, process, or interface by which the data can be analyzed, reported, and/or acted upon maybe provided.

Mobile systems are built with human usage in mind. Therefore the control plane in network elements like Radio Network Controller (RNC) and Base Station Controller (BSC) are optimized for human needs related to voice and data services. M2M communication has other needs and the issue is to mix these two categories of "users" without affecting performance for the system.

One problem is resource utilization. When a mobile terminal access the network i.e. goes from a battery saving state to an active state, it will allocate resources in the radio access network (RAN) and Core Network (CN). The time these resources are allocated are set with a human usage pattern in mind. One example may be that in a typical WCDMA network a user will be in active (Cell_DCH) and semi-active (Cell_FACH) states for ~30 seconds after having performed any PS data transactions. Being in active/semi-active state will allow for faster access to the network and the reason for keeping the user in these states for ~30 seconds is to get web-reading performance.

During the time a mobile terminal/M2M device allocates resources it will have a cost in RAN and CN and therefore it may affect the operation of other mobile terminals/M2M devices.

With a lot of M2M devices in an area, which may be the case in a densely populated area, the performance of other, human operated, terminals/devices may be affected.

SUMMARY

It is therefore an object to obviate at least some of the above mentioned disadvantages and to improve the performance in a communication system.

According to a first aspect, the object is achieved by a method in a server for scheduling of an information transmission from an information providing device to a subscriber equipment. The server, the information providing device and the subscriber equipment are comprised in a communication system. The method comprises obtaining a desired moment in time, indicating when the subscriber equipment desires information to be received. Also, the method comprises estimating the communication intensity in the communication system at the desired moment in time. Additionally, the method further comprises scheduling a moment in time for the information providing device to provide information to the subscriber equipment, based on the desired moment in time and the estimated communication intensity at the desired moment in time. Furthermore, the method comprises requesting the information providing device to transmit information to the subscriber equipment at the determined moment in time.

According to a second aspect, the object is achieved by a server for scheduling of an information transmission from an information providing device to a subscriber equipment. The server, the information providing device and the subscriber equipment are comprised in a communication system. The server comprises a processing circuit. The processing circuit is configured to obtain a desired moment in time, indicating when the subscriber equipment desires information to be received. The processing circuit is further configured to estimate the communication intensity in the communication system at the desired moment in time. In addition, the processing circuit is also configured to schedule a moment in time—i.e., the processing circuit determines a "scheduled" moment—for the information providing device to provide information to the subscriber equipment, based on the desired moment in time and the estimated communication intensity at the desired moment in time. Additionally, the server further comprises a sender. The sender being configured to send a request to the information providing device, requesting the information providing device to provide information to the subscriber equipment at the determined (i.e., scheduled) moment in time.

According to a third aspect, the object is achieved by a method in an information providing device for enabling scheduling of an information transmission in a server. The wireless information transmission is performed from the information providing device to an subscriber equipment. The information providing device, the server and the subscriber equipment are comprised in a communication system. The method comprises receiving a request from the server, requesting the information providing device to provide information to the subscriber equipment at a moment in time. Further, the method comprises obtaining information according to the received request. In addition, the method comprises transmitting information to the subscriber equipment at the determined moment in time according to the received request.

According to a fourth aspect, the object is achieved by an information providing device for enabling scheduling of an information transmission in a server. The information transmission is performed from the information providing device to a subscriber equipment. The information providing device, the server and the subscriber equipment are comprised in a communication system. The information providing device comprises a receiver. The receiver is configured to receive a request from the server, requesting the information providing device to provide information to the subscriber equipment at a determined moment in time. Further, the information providing device comprises a transmitter. The transmitter is configured to transmit information to the subscriber equipment at the determined moment in time.

Thanks to embodiments of the present methods and devices, by scheduling transmissions, the moment of information transmissions made from information providing devices within an area may be distributed over time. Thus the number of simultaneous information transmissions made from information providing devices within an area may be reduced, which reduces the risk of load spikes within the system. Thus the performance of the communication system is improved.

Embodiments of the present methods and devices are spreading and distributing the access attempts made by information providing devices in time, which has the effect of lowering the blocking probability. Thereby the performance for other, human users within the system is improved.

Embodiments of the present methods and devices give operators more control of information providing devices from different companies that use their radio access technologies in order to retrieve information data. The better control thus enabled, allows the operator to utilize its network optimal and lowers the cost of introducing M2M communication.

Embodiments of the present methods and devices describe a solution that allows network operators to provide M2M communication but at the same time balance the network load within the communication system.

Other objects, advantages and novel features will become apparent from the following detailed description of the present solution.

BRIEF DESCRIPTION OF THE DRAWINGS

The methods and devices are described in more detail with reference to attached drawings illustrating exemplary embodiments in which.

DETAILED DESCRIPTION

Embodiments herein include a server, a method in a server, an information providing device and a method in an information providing device, which may be put into practice in the embodiments described below. These embodiments may, however, be exemplified and realised in many different forms and are not to be considered as limited to the embodiments set forth herein; rather, these embodiments are provided so that this disclosure will be thorough and complete.

Still other objects and features may become apparent from the following detailed description considered in conjunction with the accompanying drawings. It is to be understood, however, that the drawings are designed solely for purposes of illustration and not as a definition of the limits of the solution, for which reference is to be made to the appended claims. It is further to be understood that the drawings are not necessarily drawn to scale and that, unless otherwise indicated, they are merely intended to conceptually illustrate the structures and procedures described herein.

Figure 1:
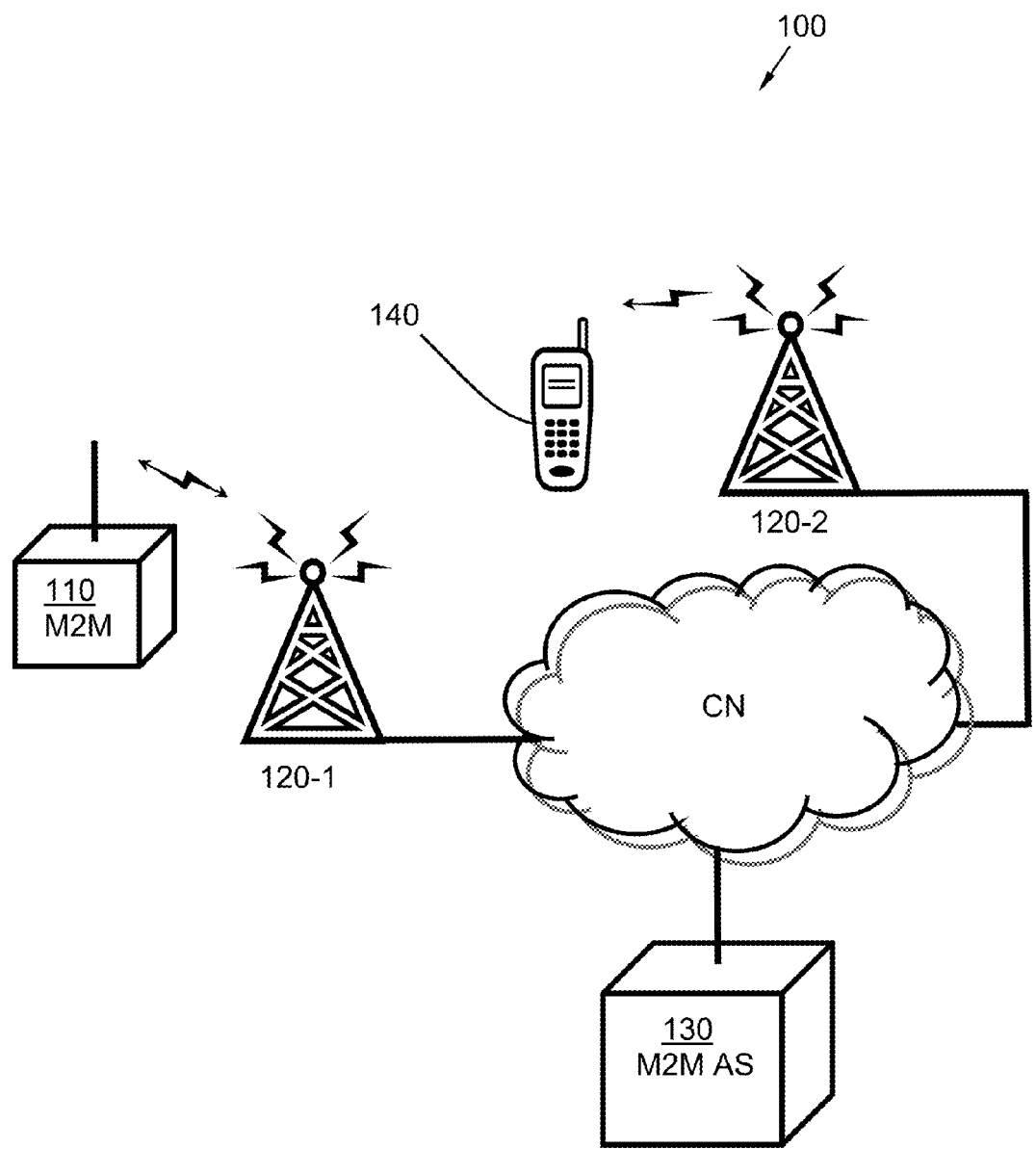
FIG. 1 is a schematic block diagram illustrating an exemplary communication system according to some embodiments.

FIG. 1 depicts a communication system 100. The communication system 100 comprises at least one information providing device 110, or M2M device as it also may be referred to. The information providing device 110 may comprise e.g. mobile access chipset, software to handle data and presumably sensors or meters configured to collect measurement data of interest according to some embodiments. Such data may comprise e.g. energy consumption, temperature, inventory level, light, motion, magnetic fields, gravity, humidity, vibration, pressure, electrical fields, sound, and other physical aspects of the external environment, just to mention some few examples. The information providing device 110, or M2M device, will be further explained and discussed in detail in conjunction with FIG. 7.

The communication system 100 may at least partly be based on radio access technologies such as e.g. 3rd Generation Partnership Project (3GPP) Long Term Evolution (LTE), LTE-Advanced, Evolved Universal Terrestrial Radio Access Network (E-UTRAN), Universal Mobile Telecommunications System (UMTS), Global System for Mobile communications/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), just to mention some few options.

The communication system 100 may be configured to operate according to the Time Division Duplex (TDD) and/or the Frequency Division Duplex (FDD) principle, according to different embodiments.

TDD is an application of time-division multiplexing to separate uplink and downlink signals in time, possibly with a guard period situated in the time domain between the uplink and downlink signalling. FDD means that the uplink and downlink signals are separated in frequency.

The purpose of the illustration in FIG. 1 is to provide a simplified, general overview of the present methods and the functionalities involved.

The illustrated exemplary communication system 100 further comprises two distinct instances of network nodes 120-1, 120-2. The network nodes 120-1, 120-2 are connected, via a core network (CN) to a server 130. It is to be noted that the illustrated setting of network nodes 120-1, 120-2 is only exemplary. The communication system 100 may comprise network nodes 120 in any number and combination.

The network nodes 120-1, 120-2 may be represented by e.g. base stations, Radio Base Stations (RBSs), macro base stations, NodeBs, evolved Node Bs (eNBs, or eNode Bs), base transceiver stations, Access Point Base Stations, base station routers, micro base stations, pico base stations, femto base stations, Home eNodeBs, relays and/or repeaters, sensor, beacon device or any other network node configured for communication or signal transmission over a wireless interface, depending e.g. of the radio access technology and terminology used. In the subsequent part of the disclosure, the term "network node" will be used for the network node 120, in order to facilitate the comprehension of the present embodiments.

In addition, the communication system 100 comprises a server 130, or application server, M2M application server, or even M2M AS, as it also may be referred to. The server 130 may be operated by e.g. the access operator but it may also be a solution owned and operated by e.g. an M2M subscriber, or by a service provider. The server 130 is further presented, discussed and explained in detail, in conjunction with FIG. 5.

The server 130 may be connected to the communication system 100 via a core network CN. The core network, or network core, or backbone network as it also may be referred to, provides various services to customers who are connected by the radio access network. Typically it refers to the high capacity communication facilities that connect primary nodes. Core/backbone network provides path for the exchange of information between different sub-networks and/or different network nodes 110, 120.

Further the communication system 100 is configured to comprise at least one subscriber equipment 140, or information subscriber, or M2M subscriber, as it also may be referred to. The subscriber equipment 140 may be managed by a company, an individual human person or even a machine, such as e.g. a computer, interested in the data the information providing device 110, collects and distributes.

The subscriber equipment 140, or M2M subscriber or information subscriber, may be represented e.g. by a wireless communication terminal, user equipment (UE), mobile station, mobile cellular phone, Personal Digital Assistant (PDA), wireless platform, laptop, computer, base station, Radio Base Stations (RBSs), macro base stations, NodeBs, evolved Node Bs (eNBs, or eNode Bs), base transceiver stations, Access Point Base Stations, base station routers, micro base stations, pico base stations, femto base stations, Home eNodeBs, server or any other kind of device configured to receive information from the information providing device 110 and/or from the server 130 over a wired or wireless interface. In the subsequent part of the disclosure, the term "subscriber equipment" will be consistently utilized for the subscriber equipment 140, in order to facilitate the comprehension of the present embodiments.

An access operator may manage the radio access network and/or core network comprised in the communication system 100 and alternatively also the server 130, according to some embodiments.

According to some embodiments the information providing device 110 may have another handling in the communication system 100 other than human controlled mobile terminals. The issue of being in active/semi-active states for long can be realized using e.g. fast dormancy in WCDMA. This means that the information providing device 110 forces itself down to a battery saving state i.e. idle mode, by removing the signalling connection to the communication system 100.

The first network node 120-1 in the illustrated exemplary embodiment may be configured to communicate with the information providing device 110 over a wireless interface. Further, the first network node 120-1 may communicate with the server 130 over a wired or wireless interface according to some embodiments. Further, according to some embodiments a second network node 120-2 may be configured to communicate with the server 130 over a wired or wireless interface, and also with at least one subscriber equipment 140 over a wired or wireless interface according to different embodiments.

However, the information providing device 110 may according to some alternative embodiments communicate over a wired interface with the server 130 and/or with the subscriber equipment 140. The connection between the information providing device 110 and the server 130 and/or with the subscriber equipment 140 may comprise standard ethernet or phone line connection, or a WiFi and/or wireless connection according to some embodiments. Any of information providing device 110, the server 130 and/or the subscriber equipment 140 may be configured to manage the communications link concerning e.g. service activations, provisioning, usage controls, fraud management, cost management, etc. Further a software agent, process, or interface by which information data may be analyzed, reported, and/or acted upon may be provided according to some embodiments.

A non-limiting example of an embodiment will now be described, in order to enhance the understanding the functionalities of the present methods and devices.

An electricity company may place electricity meters at the home of their customers. In a certain geographical area, there may be thousands of customers, which the electricity company want to bill e.g. at the last day of the month.

The electricity company may place an information providing device 110 at the home of each of their customers. Each information providing device 110 may comprise an electricity meter; be comprised within an electricity meter; be attachable to an electricity meter and/or configured to communicate with the electricity meter according to different embodiments. Each information providing device 110 may then be requested by the server 130 at what moment in time the value of the electricity meter is to be read and sent to the subscriber equipment 140, which in this exemplary case is the electricity company. The server 130 may thus schedule the transmissions from the information providing devices 110 in order to distribute them in time, avoiding or at least reducing the risk of load spikes and/or that human mobile terminal users are blocked from communication.

In order to schedule the transmissions, the server 130 may apply an appropriate algorithm, based on any, some or all of e.g. when the subscriber equipment 140 desires the information, the radio access technology utilized within the wireless interface between the base station 120 and the information providing device 110, estimated traffic load in the system 100 etc. In this particular non-limiting example, it may be assumed that e.g. 360 information providing devices 110 are situated within the cell of the base station 120, and that the traffic load within the communication system 100 is low between two and three a clock in the night, and that the subscriber equipment 140 desires the information at eight a clock in the morning of the $26^{th}$ day of each month. The server 130 may then schedule the information providing device 110 with a 10 seconds interval between two a clock and three a clock in the night, just to mention an example.

Figure 2:
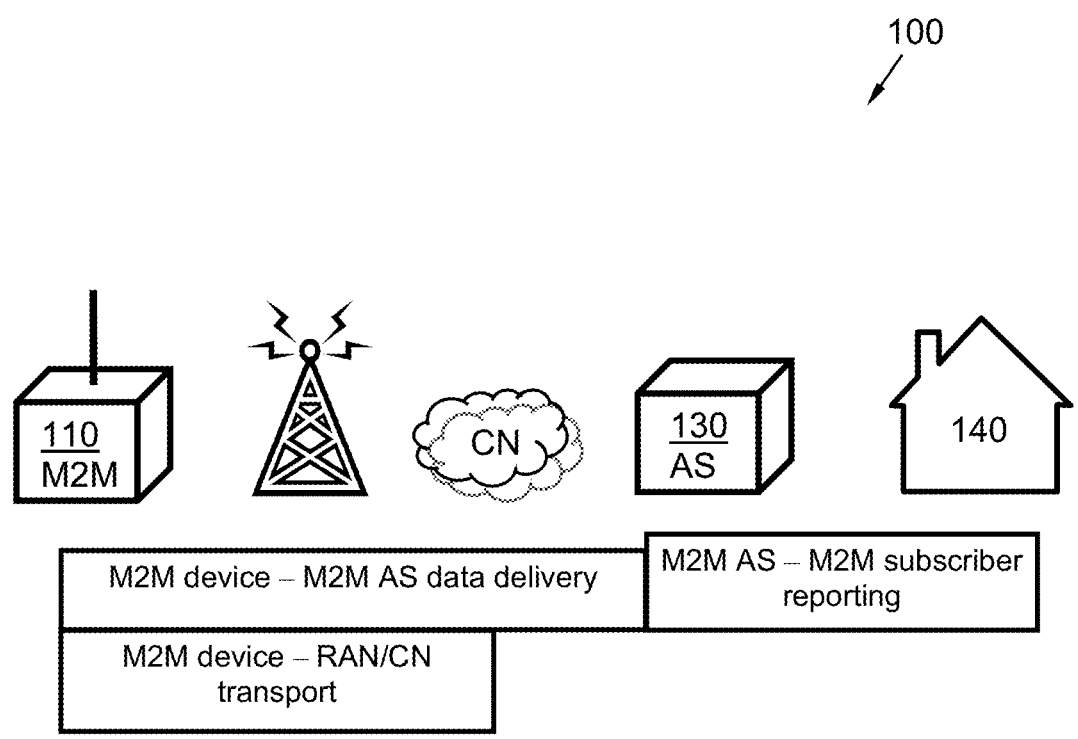
FIG. 2 is a schematic block diagram illustrating an exemplary communication system according to some embodiments.

FIG. 2 depicts another embodiment of the communication system 100, previously discussed in conjunction with FIG. 1.

In the illustrated embodiment in FIG. 2, the subscriber equipment 140 is connected to the server 130 over a wired interface. Otherwise concerning the information providing device 110, network nodes 120, core network, radio access network, server 130 and subscriber 140, reference is made to the discussions and explanations made in conjunction with FIG. 1.

However, it may be pointed out in particular, that in a typical scenario is a plurality of information providing devices 110 connected to and managed by the server 130.

The information providing device 110 may access the communication system 100 i.e. the radio access network and/or the core network, which optionally may be owned by the access operator.

It may be noted that a plurality of information providing devices 110 may be comprised within the communication system 100, as well as a plurality of information subscribers 140. Thus, for example, several information providing devices 110 may send different information data to one single subscriber equipment 140; one information providing device 110 may send the same information to several subscriber equipment 140 or one information providing device 110 may send information at a regularly repeating time interval to one or more subscriber equipment 140, just to mention some options. Further, the communication system 100 may comprise a plurality of servers 130, which may be e.g. managed by different operators.

According to embodiments of the present method is scheduling of M2M traffic on geographical/cell-level. The present method is performed on a server 130. The server 130 may be a stand alone product or an add-on product, provided by e.g. the operator of the subscriber equipment 140 or the access operator. However the server 130 may be comprised within the communication system 100 e.g. at some node 110, 120, 140, according to some embodiments.

The server 130 may or may not be owned by the access operator providing the access service. However, the access operator may own the server 130 and sell a managed M2M service to subscriber equipment 140, according to some embodiments.

The entities 110, 130, 140 within the communication system 100 may relate to and communicate with each other in the following way: The information providing device 110 and the server 130 are configured to communicate with each other such that the server 130 may request data delivery from the information providing device 110 by sending e.g. a request to the information providing device 110. The information providing device 110 may then in response to the received request, send registration data to the server 130. The registration data may comprise e.g. location data, information categorisation data, priority data, geographical area/cell information data, just to mention some options. The server 130 may register the information providing device 110 and may potentially provide further information or instructions to the information providing device 110.

The server 130 may relate to the subscriber equipment 140 in such a way that the server 130 is used to report the data collected by the information providing device 110 back to the subscriber equipment 140. It may do this directly when the data is stored or after having stored or even post processed the data. This is a setting that the subscriber equipment 140 may manipulate, for example maybe via a subscription.

A non-limiting example of an embodiment within the present context will now be described. In a geographical area such as e.g. a cell there may be e.g. 1000 registered information providing devices 110, all using WCDMA as radio access technology. 400 out of these are to be reporting i.e. sending information data to subscriber equipment 140 every hour. It may further be assumed that the geographical area comprises a WCDMA cell which may allow 32 simultaneous devices configured to communicate packet switched data. The exemplary human usage pattern in this cell may be that about half of the resource of 32, is used by human cell phone users at any given point in time, i.e. 16. The typical data transfer time may be 2 seconds. The same value may be used for all human users in this exemplary embodiment, for simplicity.

At the next full hour, all the 400 information providing devices 110 cannot simultaneously access the radio access network since there may only be 32 simultaneous users. And thus the blocking percentage will be high, such that human cell phone users may not be able to access the radio access network. So the server 130, or a time scheduling unit comprised within the server 130, may calculate that max 16 information providing devices 110 are allowed to have access at the time, while 16 users are assumed to be human cell phone users.

Every access may take 2 seconds plus time for connecting/disconnecting to/from the radio access network/core network/communication system 100. This may be assumed to take in total 5 seconds.

The server 130, or the time scheduling unit comprised within the server 130 may group the 400 information providing devices 110 into 25 groups of 16 information providing devices 110 in each. Group 1 may be requested to send data at the full hour; the second group may be requested to send data 5 seconds later and so on. By this the data collection is spread out for approximately 2 minutes lowering the blocking probability significantly. Thereby may sudden load spikes within the communication system 100 be avoided, or at least may the risk of suffering from such load spikes be somewhat reduced.

Another general, non-limiting example of a general algorithm for scheduling the transmissions of information providing devices 110 in time may be made.

The number of information providing devices 110 to be scheduled in a certain location area, e.g. cell, at the desired time T may be called M.

Thus the number of information providing devices 110 to be scheduled at the desired time T may be a function of the current time T_curr; the maximum number of simultaneous devices per local area, e.g. cell, N, based on current system resource limitation; the estimated time for resource occupancy T_resource; the information providing device 110, i, and the location of the information providing device 110, m_i; and the information needed at time T_info.

Hence: M=f(T_curr, N, T_resource, i, m_i, T_info)

The total number of time instances that the information providing devices 110 may be scheduled at may be called J.

Thus: J=(T_info−T_curr)/(T_resource+T_guard)

T_guard is a guard period to separate the transmissions from different information providing devices 110 from each other.

So at time T_curr+(T_resource+T_guard)*j, where j goes from j=0:(J−1), a group of information providing devices 110 may be scheduled. The number of information providing devices 110 per group may be sum(m_i)/N, according to some embodiments.

Figure 3:
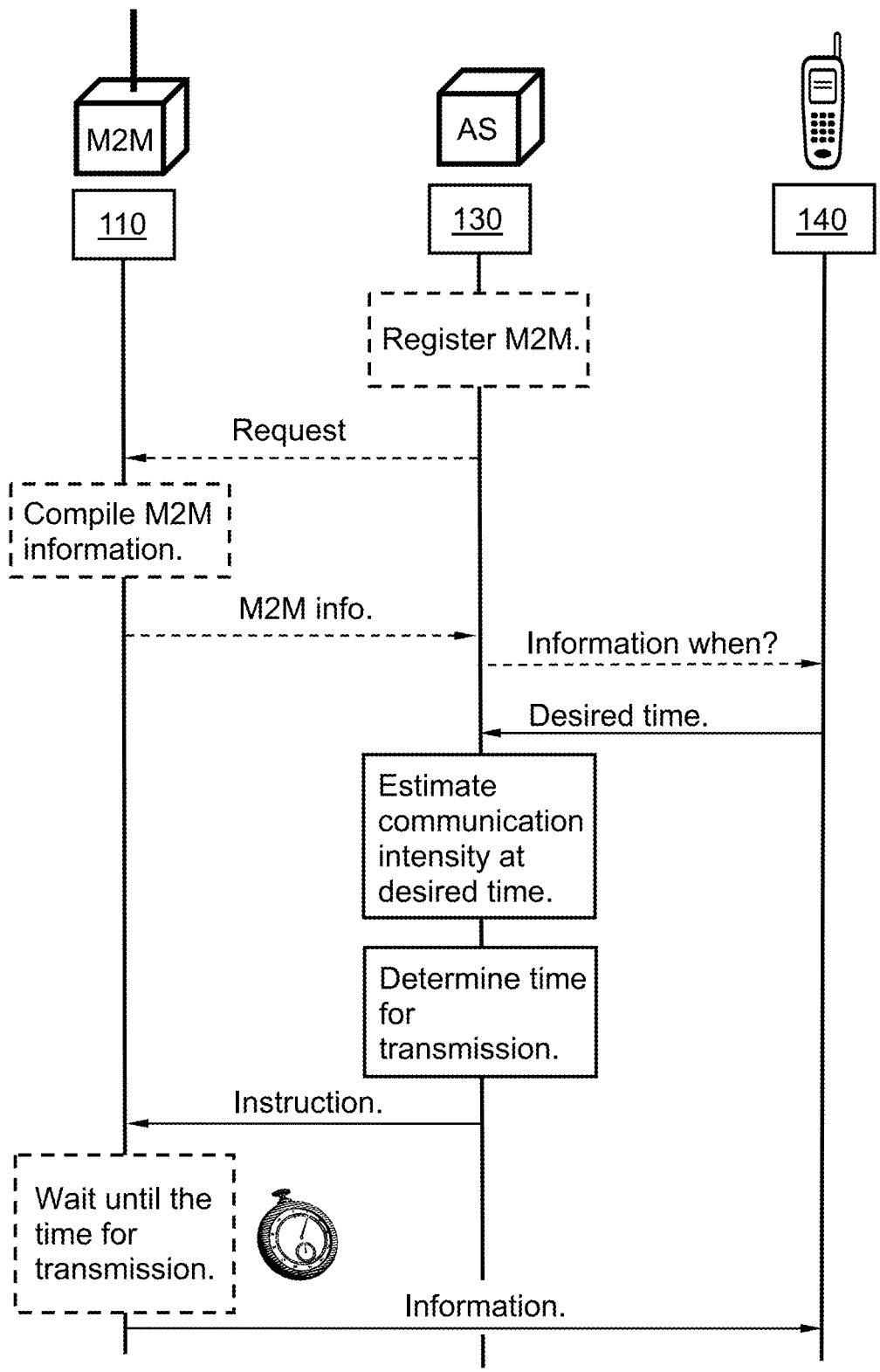
FIG. 3 is a combined signalling scheme and schematic block diagram illustrating an exemplary embodiment.

FIG. 3 is a combined signalling scheme and schematic block diagram illustrating an exemplary embodiment of the present method for time scheduling of information transmission from an information providing device 110, to a subscriber equipment 140. The purpose of the illustration in FIG. 3 is to present a general overview of the context in which embodiments of the present method may be performed.

An embodiment of signalling performed between the information providing device 110, the subscriber equipment 140 and the server 130 is illustrated in FIG. 3. However, it is to be understood that although only one instance of information providing device 110, subscriber equipment 140 and server 130 are illustrated in FIG. 3 for clarity reasons, a plurality of information providing devices 110, subscriber equipment 140 and/or servers 130 may be involved in the present method, as already discussed in conjunction with the discussions related to FIG. 1 and FIG. 2.

Thus whenever "one" or "a/an" information providing device 110, subscriber equipment 140 and/or server 130 is referred to in the subsequent description, a plurality of information providing devices 110, subscriber equipment 140 and/or servers 130 may be involved.

An exemplary embodiment of the present method will now be described in a number of actions. It is to be noted that the actions according to some embodiments may be performed in another sequential order than the order of presentation indicates. Also, it may be noted that some of the described actions are optional and only comprised within some embodiments.

The server 130 may be configured to detect and register all information providing devices 110 within range, e.g. situated in the same geographical region. Thus the server 130 may register the information providing device 110 according to some embodiments.

The server 130 may according to some alternative embodiments collect radio access technology info and geographical/cell info from all information providing devices 110, or from a Location Retrieval Function (LRF).

Further, the server 130 may send a request to the information providing device 110, requesting data delivery from the information providing device 110, according to some embodiments.

The information providing device 110 may then in response to the received request, compile and send registration data to the server 130. The registration data may comprise e.g. location data, information categorisation data, priority data, geographical area/cell information data, just to mention some options. The server 130 may register the information providing device 110 and may potentially provide further information or instructions to the information providing device 110.

The server 130 may further decide when information from the information providing device 110 is to be sent to the subscriber equipment 140. This may be decided based on a request made to the subscriber equipment 140, or in any other appropriate way.

Thus the server 130 may implement a function that calculates when the information providing device 110 may deliver data. It may use input like: when do the subscriber equipment 140 desires data, the number of information providing device 110 in the geographical area/cell, and when they are due to deliver data, traffic model/measurements for "human usage" in the current geographical area/cell and/or estimated load within the communication system 100.

When the server 130 has determined when the information providing device 110 may deliver data, it may send a request or instruction for data delivery to the information providing device 110. Optionally, the request for data delivery may be sent previous to the decided moment in time, e.g. in order for the information providing device 110 to perform the information retrieval from sensors etc. Further, according to some embodiments may the information providing device 110 deliver data to the server 130 at any arbitrary moment, or at a moment selected by the information providing device 110, and the server 130 instead determine the appropriate moment in time for sending the information to the subscriber equipment 140.

According to some embodiments may the information providing device 110 be paged, if that is determined to be of advantage. Thus the information providing device 110 may deliver data and perform fast dormancy to quickly release resources used.

The information providing device 110 may also be configured to a specific calculated time interval when to report its data without a preceding data request, according to some embodiments. That specific calculated time interval may be calculated by the server 130, based on e.g. when do the subscriber equipment 140 desires data, the number of information providing device 110 in the geographical area/cell, and when they are due to deliver data, traffic model/measurements for "human usage" in the current geographical area/cell and/or estimated load within the communication system 100.

Figure 4:
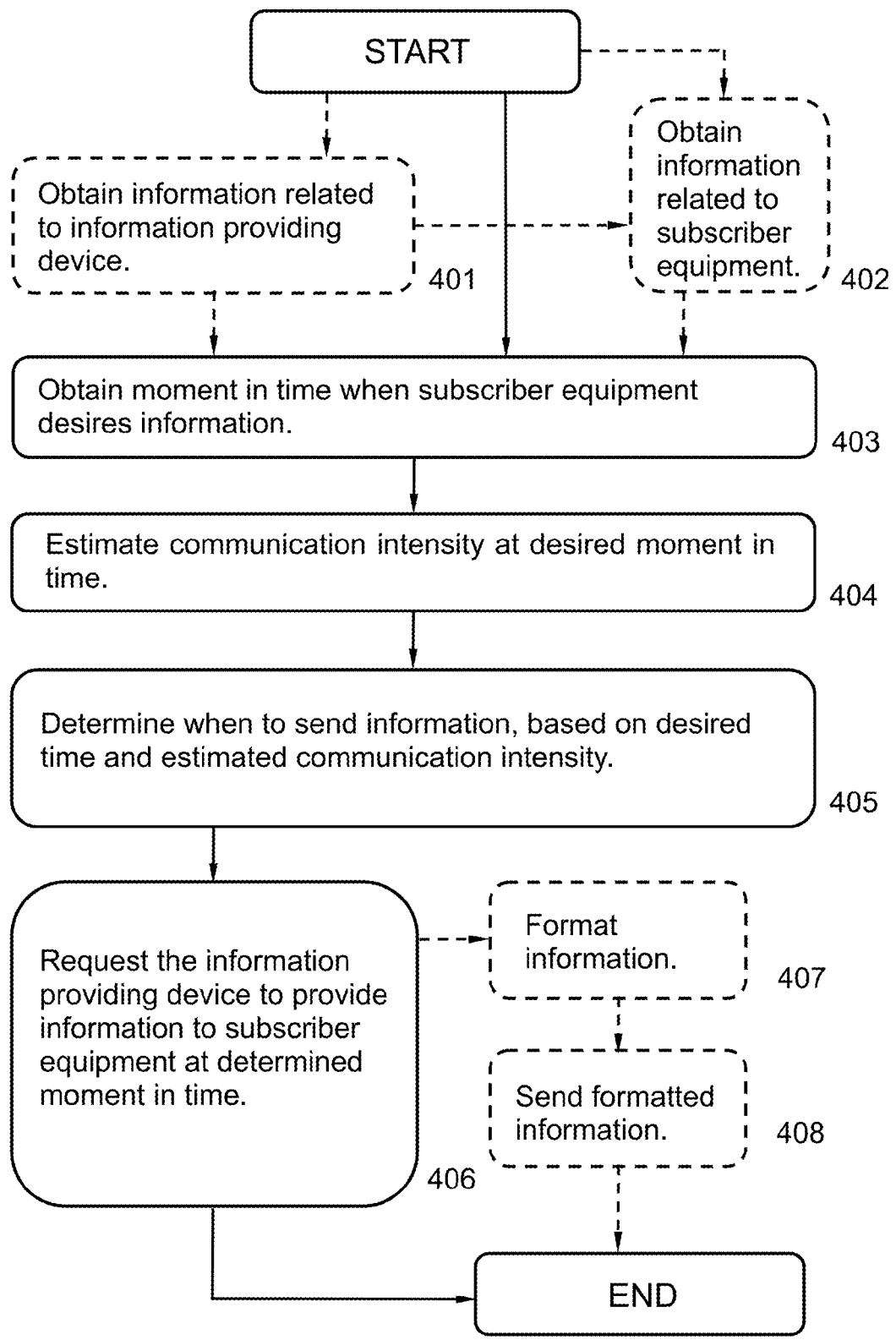
FIG. 4 is a schematic block diagram illustrating an exemplary embodiment of the present method in a server.

FIG. 4 is a flow chart illustrating embodiments of a method in a server 130. The method aims at time scheduling of an information transmission from an information providing device 110 to an subscriber equipment 140. The information providing device 110, the server 130 and the subscriber equipment 140 are comprised in a communication system 100.

To appropriately perform time scheduling of an information transmission from the information providing device 110 to the subscriber equipment 140, the method may comprise a number of actions 401-408.

It is however to be noted that some of the described actions, e.g. action 401-408 may be performed in a somewhat different chronological order than the enumeration indicates and that some of them, e.g. action 401, 402 and 406-408, are performed within some alternative embodiments. Further, any, some or all actions, such as e.g. 403 and 404 may be performed simultaneously or in a rearranged chronological order. The method may comprise the following actions:

Action 401

This action may be performed within some alternative embodiments.

The server 130 may obtain registration information related to the information providing device 110.

Registration information to be obtained may comprise any, some or all of: the location of the information providing device 110, the communication technology used by the information providing device 110 and/or information data related to the information providing device 110, according to some embodiments.

Action 402

This action may be performed within some alternative embodiments.

The server 130 may obtain registration information related to the subscriber equipment 140. The registration information to be obtained may comprise any, some or all of: the location of the subscriber equipment 140, the communication technology used by the subscriber equipment 140, traffic load in the part of the communication system 100 the subscriber equipment 140 is accessed to, and/or information data related to the subscriber equipment 140, according to some embodiments.

Action 403

The server 130 obtains a desired moment in time, indicating when the subscriber equipment 140 desires information to be received.

According to some embodiments may a request be send to the subscriber equipment 140, requesting such information. According to some embodiments may the subscriber equipment 140 have recorded when information is desired to be received previously, e.g. upon registration to the service. The server 130 may then obtain the desired moment in time from a memory storage or data base.

Action 404

The server 130 estimates the communication intensity in the communication system 100 at the desired moment in time.

The estimation of the communication intensity in the communication system 100 at the determined moment in time may according to some embodiments comprise: the number of transmissions within the communication system 100 and/or measured or estimated traffic load within the communication system 100.

Action 405

The server 130 schedules a moment in time for the information providing device 110 to provide information to the subscriber equipment 140, based on the desired moment in time and the estimated communication intensity at the desired moment in time.

The scheduling of the moment in time for the information providing device 110 to provide information to the subscriber equipment 140 may further be based on an obtained priority value of any of the information providing device 110, the subscriber equipment 140, or information to be transmitted, according to some embodiments.

The scheduling of the moment in time for the information providing device 110 to provide information to the subscriber equipment 140 may further be based on information obtained from the information providing device 110, according to some embodiments.

The scheduling of the moment in time for the information providing device 110 to provide information to the subscriber equipment 140 may further be based on information obtained from the subscriber equipment 140 according to some embodiments.

The scheduling of the moment in time for the information providing device 110 to provide information to the subscriber equipment 140 may further be based on an estimation of the data size of information to be transmitted.

The scheduling of the moment in time for the information providing device 110 to provide information to the subscriber equipment 140 may further comprise comparing the estimated communication intensity at the desired moment in time with a threshold value. Further, it may comprise calculating another moment in time for the information providing device 110 to provide information, if the estimated communication intensity exceeds the threshold value.

The scheduling of the moment in time for the information providing device 110 to provide information to the subscriber equipment 140 may further comprise applying a distribution algorithm, for distributing the scheduled information transmission in time, such that load spikes within the communication system 100 are avoided, according to some embodiments.

Thereby may the server 130 schedule several information transmissions from several information providing devices 110, such that load spikes within the communication system 100 is avoided.

Action 406

The server 130 requests the information providing device 110 to provide information to the subscriber equipment 140 at the scheduled moment in time.

The information providing device 110 is thus requested to provide information to the subscriber equipment 140 at the determined moment in time.

According to some embodiments may the information providing device 110 be requested to transmit information to the subscriber equipment 140 directly to the subscriber equipment 140, at the determined moment in time.

The request to the information providing device 110 may comprise transmitting information via the server 130, according to some embodiments. According to some such embodiments may the transmission to the server 130 be made at the determined moment in time.

The request may comprise an explicit or implicit specification of information to be provided. Thus, in case the information providing device 110 is only able to perform one type of measurement and provide one type of information, e.g. reading of an electricity meter, the reception of a request implicitly may indicate that a reading is to be performed. In case the information providing device 110 is able to perform a plurality of different measurements and provide several types of information, e.g. a weather station, it may be specified which measurement(s) to be performed and/or which information to be provided.

Action 407

This action may be performed within some alternative embodiments, wherein the information providing device 110 transmits the information via the server 130, instead of directly to the subscriber equipment 140.

Information received from the information providing device 110 may be formatted into a format appropriate for further transmission to the subscriber equipment 140.

Action 408

This action may be performed within some alternative embodiments, wherein the information providing device 110 transmits information via the server 130, instead of directly to the subscriber equipment 140.

Formatted information may be sent to the subscriber equipment 140. The transmission to the subscriber equipment 140 may be at the determined moment in time according to some embodiments. However, the transmission to the subscriber equipment 140 may according to some embodiments be at any other appropriate moment in time.

Figure 5:
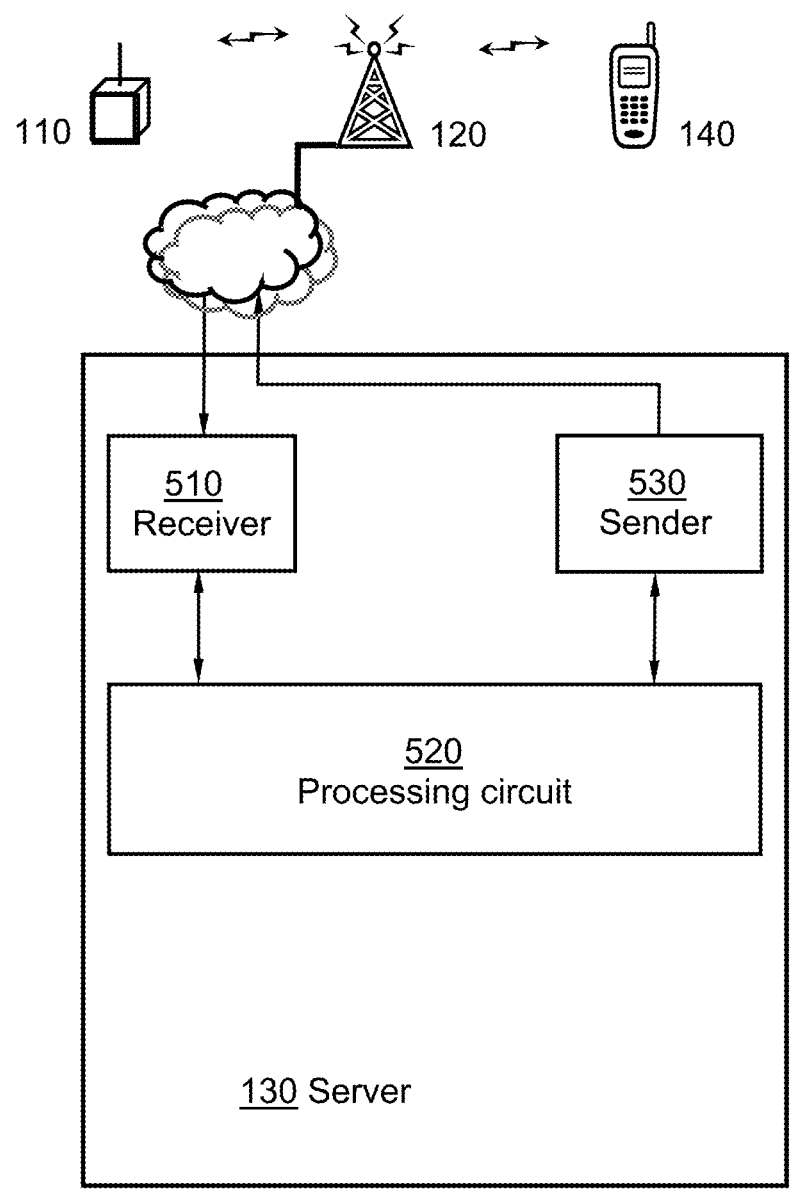
FIG. 5 is a schematic block diagram illustrating an exemplary embodiment of the present server.

FIG. 5 is a schematic block diagram illustrating an server 130 for scheduling of an information transmission from an information providing device 110 to a subscriber equipment 140 according to some embodiments. The server 130 may be referred to as an M2M application server. The server 130, the information providing device 110 and the subscriber equipment 140 are comprised in a communication system 100.

The server 130 comprises a processing circuit 520. The processing circuit 520 may be represented by e.g. one or more instances of a processor, a Central Processing Unit (CPU), a microprocessor, an Application-Specific Integrated Circuit (ASIC) or other processing logic that may interpret and execute instructions. The processing circuit 520 may perform any, some or all data processing functions for inputting, outputting, and processing of data including data buffering and device control functions, such as call processing control, user interface control, or the like.

The processing circuit 520 is configured to obtain a desired moment in time, indicating when the subscriber equipment 140 desires the information to be received. Further, the processing circuit 520 is configured to estimate the communication intensity in the communication system 100 at the desired moment in time. Additionally, the processing circuit 520 is configured to schedule a moment in time for the information providing device 110 to provide information to the subscriber equipment 140. The decision may be based on the desired moment in time and the estimated communication intensity at the desired moment in time. The processing circuit 520 may further be configured to apply an algorithm for distributing the moment in time for the information providing device 110 to provide information to the subscriber equipment 140, in order to avoid load spikes within the communication system 100. The processing circuit 520 may further be configured to process received information data by applying an algorithm, according to some embodiments.

The processing circuit 520 may thus be configured to perform, enable or supply the performance of any, some or all of the actions 401-408, to at least some extent, according to some embodiments.

The server 130 comprises a sender 530. The sender 530 is configured to send a request to the information providing device 110, requesting the information providing device 110 to transmit information to the subscriber equipment 140 at the determined moment in time. The sender 530 may according to some embodiments be configured to send signals i.e. request and/or trigger signals to one or more information providing devices 110 and/or subscriber equipment 140, comprised within the communication system 100.

The server 130 may comprise a receiver 510 according to some embodiments. The receiver 510 may be configured to receive signals and/or information data from one or more information providing devices 110 and/or subscriber equipment 140 comprised within the communication system 100.

The server 130, or the processing circuit 520 comprised therein may according to some embodiments in addition further comprise a M2M data collection unit, a M2M subscriber reporting unit, a M2M time scheduling unit, a data storage and a location retrieval unit, or be configured to provide corresponding functionalities.

The M2M data collection unit may be used to request data delivery at a give time calculated in the M2M time scheduling unit, and to collect information data. The M2M subscriber reporting unit may be configured to deliver data to the subscriber equipment 140.

The server 130, or the processing circuit 520 comprised therein may be configured to be used to keep information about the information providing devices 110 and use that information to calculate when the information providing device 110 may deliver data. It may further delay/abort data transmission if a new location is retrieved and there may be a risk for overload. It may further decide whether the information providing device 110 may have a PDP context activated, and/or a signalling connection available, according to some embodiments. If necessary it may be configured to wake up the information providing device 110 by means of sending an SMS, e.g. in case that a PDP context needs to be activated by the information providing device 110. It may further configure the information providing device 110 to send, on a time interval when it is to do its data reporting without a prior request.

The processing circuit 520 may be connected to a data storage unit, which may be used to store information data from when it is collected until it is reported to the subscriber equipment 140 according to some embodiments. Information data may be further post-processed, according to some embodiments, before distributed to the subscriber equipment 140.

The location retrieval function may keep track of the information providing device 110, according to some embodiments.

The server 130 may be in charge of device management and may send configuration data to the information providing device 110, according to some embodiments.

Further, according to some embodiments, the server 130, or the processing circuit 520 comprised therein may be configured to obtain how often and approximately when the subscriber equipment 140 wants to have data collected. Also, it may be configured to obtain which Radio Access Technology (RAT) is used by the information providing device 110, according to some embodiments. Further, it may be configured to obtain the limitations of the RAT used in that particular geographical area, e.g. HSDPA may only support 16 or 32 parallel users in different cells. In addition, the server 130, or the processing circuit 520 comprised therein may be configured to get and store the location of the information providing device 110 from a location retrieval function. First when the unit is registered and if the information providing device 110 has declared itself as a mobile unit, the location may be updated prior to data delivery, according to some embodiments. In further addition, the server 130, or the processing circuit 520 comprised therein may be configured to get and store the location of all other information providing device 110. Additionally, the server 130, or the processing circuit 520 comprised therein according to some embodiments may be configured to get information on typical human usage patterns for that radio access technology at the given time and position. Furthermore, the server 130, or the processing circuit 520 comprised therein according to some embodiments may be configured to have information of that typical data transfer time from this information providing device 110. This information may be measured at every data collection and re-used as input for coming data collection events. Also, in further addition, the server 130, or the processing circuit 520 comprised therein according to some embodiments may be configured to have a connection to RAN load estimation and admission control function in order to further take into account the system load.

Also, in further addition, the server 130, or the processing circuit 520 comprised therein according to some embodiments may be configured to use information described above to calculate a suitable time, if needed, for transmitting an SMS to the subscriber equipment 140. Also, in further addition, the server 130, or the processing circuit 520 comprised therein according to some embodiments may be configured to use this information above to calculate a suitable time for data collection.

Also, the server 130 or the processing circuit 520 comprised therein may comprise a M2M data collection unit. The M2M data collection unit may be configured to get a trigger from the M2M time scheduling unit that data is to be collected. Further, the M2M data collection unit may be configured to send a data collection request to the information providing device 110 when this trigger is received, according to some embodiments.

In further addition, the M2M data collection unit may also be configured to first request the new location of the information providing device 110 via the location retrieval function, in embodiments wherein the information providing device 110 is mobile. This information may be sent back to the M2M time scheduling unit that may give a go-ahead to collect information data or delay the data collection or even abort the data collection. When the M2M time scheduling unit gives go-ahead the request for collecting information data may be sent to the information providing device 110. Also, the M2M data collection unit may further be configured to send the collected data to the data storage. The M2M data collection unit may further be configured to get information data that may benefit from urgent handling such as e.g. fault alarms from the information providing device 110 without sending any request. This information data may be sent to the data storage tagged with further information enabling identification that it is urgently sent data.

Also, the server 130 or the processing circuit 520 comprised therein may further comprise a M2M subscriber reporting unit. The M2M subscriber reporting unit may be configured to, depending on the needs and/or desires of the subscriber equipment 140 to send collected information data stored in the data storage, to the subscriber equipment 140.

Also, the subscriber reporting unit may have different handling of different types of information data. Data tagged with information that it is urgently sent data such as e.g. fault alarms, may be sent directly to the subscriber equipment 140 while the system may collect data from several hundreds of information providing device 110, such as e.g. electrical meters in an area during a long time period and send all the collected data at a later time in one transaction to the subscriber equipment 140, according to some embodiments.

It is to be noted that internal electronics of the server 130, not completely necessary for understanding the present method have been omitted from FIG. 3, for clarity reasons.

Further, it is to be noted that some of the above described units comprised within the server 130 or the processing circuit 520 comprised therein are to be regarded as separate logical entities but not with necessity separate physical entities.

In addition, a computer program product and/or computer readable storage media comprising instructions for performing at some parts of the present method may be used for implementing the previously described method in the server 130. Any, some or all of the actions 401-408 in the server 130 may in addition be implemented through one or more processing circuits 520 in the server 130, together with computer program code for performing the functions of the present method. Thus a computer program product, comprising instructions for performing the actions 401-408 in the server 130 may schedule a wireless information transmission from an information providing device 110 to an subscriber equipment 140, when the computer program product is loaded into the processing circuits 520.

The computer program product mentioned above may be provided for instance in the form of a data carrier carrying computer program code for performing the actions 401-408 according to embodiments of the present method when being loaded into the processing circuits 520. The data carrier may be e.g. computer readable storage medium such as a hard disk, a CD ROM disc, a memory stick, an optical storage device, a magnetic storage device or any other appropriate medium such as a disk or tape that can hold machine readable data. The computer program code may furthermore be provided as program code on a server and downloaded to the server 130 remotely, e.g. over an Internet or an intranet connection.

Figure 6:
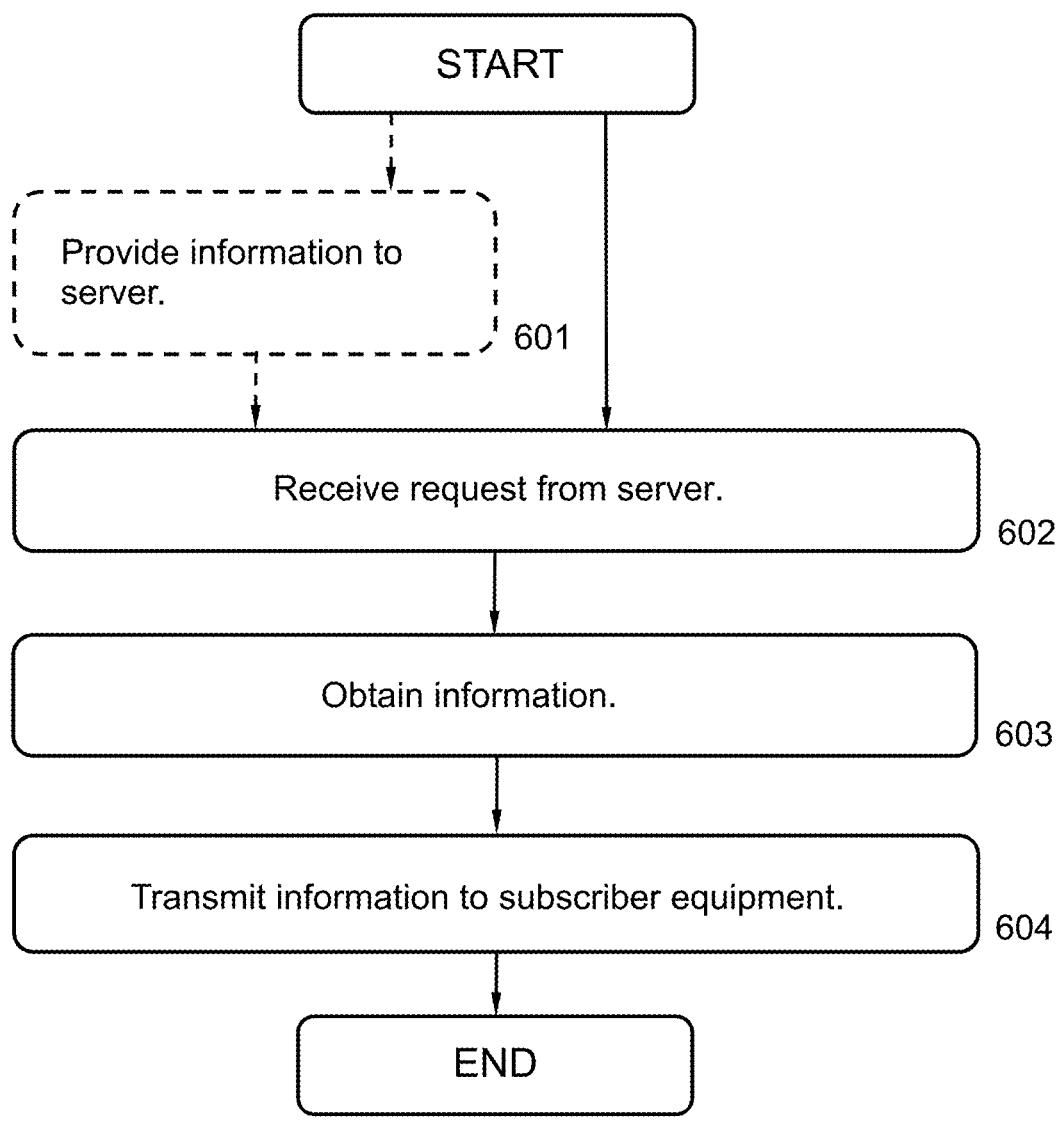
FIG. 6 is a schematic block diagram illustrating an exemplary embodiment of the present method in an information providing device.

FIG. 6 is a flow chart illustrating embodiments of a method in an information providing device 110. The method aims at enabling scheduling of an information transmission in a server 130. The information transmission is performed from the information providing device 110 to a subscriber equipment 140. The information providing device 110, the server 130 and the subscriber equipment 140 are comprised in a communication system 100.

To appropriately enabling scheduling of an information transmission in a server 130, the method may comprise a number of actions 601-604.

It is however to be noted that some of the described actions, e.g. action 601-604 may be performed in a somewhat different chronological order than the enumeration indicates and that some of them, e.g. action 601, may be performed within some alternative embodiments. Further, any, some or all actions, such as e.g. 602 and 603 may be performed simultaneously, or in a somewhat rearranged chronological order, such as e.g. reversed chronological order. The method may comprise the following actions:

Action 601

This action may be performed within some alternative embodiments.

Registration information may be provided to the server 130. Such information may comprise: type of information to be sent, radio access technology used, type of information providing device 110, priority level of information and/or information providing device 110 according to some embodiments. Such registration information may be provided once e.g. upon registration to the service according to some embodiments. However, registration information may be continuously updated or provided. Registration information may be provided upon request according to some embodiments, e.g. by receiving a dedicated request for registration information from the server 130.

Action 602

A request is received from the server 130, requesting the information providing device 110 to provide information to the subscriber equipment 140 at a moment in time.

The request may e.g. specify the requested information to be provided, the moment in time when information is to be provided and the information providing device 110 to which the information is to be provided according to some embodiments.

Action 603

Information is obtained according to the received request. Information may be obtained by measuring a value representing a physical entity e.g. obtained from a sensor. Information may according to some embodiments be obtained from a measuring unit such as e.g. an electricity meter, which may be comprised within, attached to or in communication with the information providing device 110, according to some embodiments.

Action 604

The obtained information is transmitted to the subscriber equipment 140, at the moment in time according to the received request.

According to some embodiments may information be transmitted to the subscriber equipment 140 via the server 130. Thus requested information may be transmitted to the server 130 at the moment in time according to the received request. The server 130 may then in turn distribute the received information in time and transmit it forward to the subscriber equipment 140 at any convenient moment in time, e.g. based on the communication traffic situation within the communication system 100.

Figure 7:
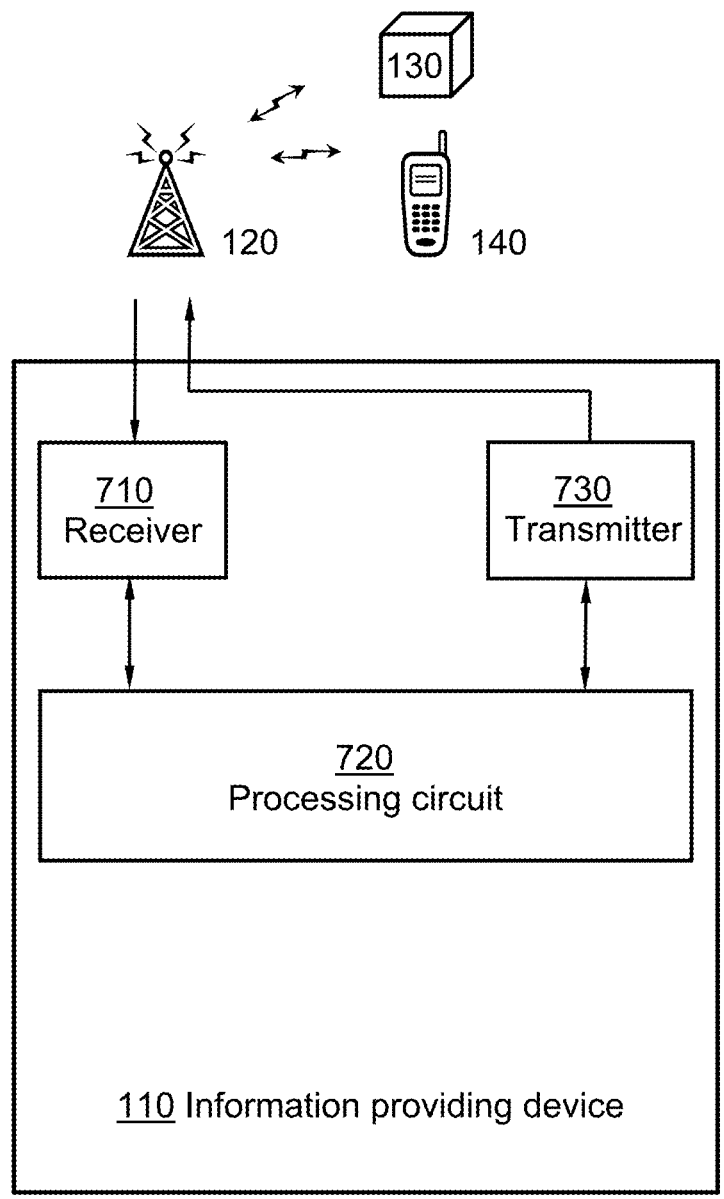
FIG. 7 is a schematic block diagram illustrating an exemplary embodiment of the present information providing device.

FIG. 7 is a schematic block diagram illustrating an information providing device 110. The information providing device 110 is dedicated for enabling scheduling of an information transmission in an server 130. The information transmission is performed from the information providing device 110 to a subscriber equipment 140. The information providing device 110, the server 130 and the subscriber equipment 140 are comprised in a communication system 100. The information providing device 110 may be referred to as an M2M device. The server 130 may be referred to as an M2M application server.

The information providing device 110 is configured to perform any, some or all of the previously described actions 601-604 for enabling scheduling of an information transmission in a server 130.

For the sake of clarity, any internal electronics or other components of the information providing device 110, not completely indispensable for understanding the present method has been omitted from FIG. 7.

In order to correctly enable scheduling of an information transmission in an server 130, the information providing device 110 comprises a receiver 710. The receiver 710 is configured to receive a request from the server 130, requesting the information providing device 110 to provide information to the subscriber equipment 140 at a moment in time.

Further, the information providing device 110 comprises a processing circuit 720. The processing circuit 720 may be represented by e.g. one or more instances of a processor, a Central Processing Unit (CPU), a microprocessor, an Application-Specific Integrated Circuit (ASIC) or other processing logic that may interpret and execute instructions. The processing circuit 520 may perform any, some or all data processing functions for inputting, outputting, and processing of data including data buffering and device control functions, such as call processing control, user interface control, or the like.

The processing circuit 720 is configured to obtain information according to the received request. In addition, the processing circuit 720 may according to some embodiments be configured to process the received request by applying an algorithm.

The processing circuit 720 may thus be configured to perform, enable or supply the performance of any, some or all of the actions 601-604, to at least some extent, according to some embodiments.

In addition, the information providing device 110 comprises a transmitter 730. The transmitter 730 is configured to transmit information to subscriber equipment 140 at the moment in time according to the received request. In addition, the transmitter 730 may be configured to transmit registration information to the subscriber equipment 140 and/or the server 130, according to some embodiments.

The information providing device 110, or M2M device as it also may be referred to, may comprise three parts, according to some embodiments: an access modem, a sensor/data collector and M2M software. The access modem is used for information providing device 110 to RAN/CN transport.

The sensor/data collector may be used for measure/collect the data that the subscriber equipment 140 is interested in collecting. The sensor/data collector may encrypt the data so that the data can only be read by the subscriber equipment 140 and not possible to decrypt in the server 130, according to some embodiments.

The M2M software may be utilized to perform the M2M service towards the server 130 and/or the subscriber equipment 140, when loaded into the processing circuit 720.

Thus the information providing device 110 may be configured to register to the server 130 and in conjunction with this registration indicate which radio access technology it uses, if this is a stationary device or a moving device and possibly other device related information data, according to some alternative embodiments. Further, the information providing device 110 may indicate its geographical position/cell-ID, e.g. in case a user plane solution for location retrieval is used.

Further the information providing device 110 is configured to receive requests for delivering information data from a server 130. The information providing device 110 may either collect information data continuously according to some embodiments, and store and deliver all information data accumulated since the last data delivery. Or, alternatively, the sensor/data collector may according to some embodiments take a snapshot at a certain time or when the request for data delivery is received, according to different embodiments.

The options whether the information providing device 110 collects information data continuously, at a certain given time, or when the request comes into the information providing device 110 is either signalled to the information providing device 110 by the server 130, a device management system or preconfigured in the information providing device 110, according to different embodiments.

If the information providing device 110 is a moving device, the geographical position/cell-Id may be continuously updated if a user plane solution for location retrieval is used. This update may be done before the request for information data from the server 130 so that the server 130 may abort/delay the transfer of the information data in case of risk for over utilization of resources for M2M traffic in the geographical area/cell.

The information providing device 110 may according to some embodiments obtain information data from the sensor/data collector that it must urgently provide to any of the server 130, or to the subscriber equipment 140. This may be e.g. fault alarms or similar. In this case the information providing device 110 may not wait for any data collection requests, but send the data immediately, according to some embodiments.

Further, it is to be noted that some of the described units 710-730 comprised within the information providing device 110 are to be regarded as separate logical entities but not with necessity separate physical entities. To mention just one example, the receiver 710 and the transmitter 730 may be comprised or co-arranged within the same physical unit, a transceiver, which may comprise a transmitter circuit and a receiver circuit, which transmits outgoing radio frequency signals and receives incoming radio frequency signals, respectively, via an antenna. The radio frequency signals transmitted between the information providing device 110 and the base station 120 may comprise both traffic and control signals e.g. paging signals/messages for incoming calls, which may be used to establish and maintain a voice call communication with another party or to transmit and/or receive data, such as SMS, e-mail or MMS messages, with a remote subscriber equipment 140, a server 130, or other node comprised in the communication system 100.

The actions 601-604 to be performed in the information providing device 110 may be implemented through one or more processing circuits 720 in the information providing device 110, together with computer program code for performing the functions of the previously described actions 601-604. Thus a computer program product, comprising instructions for performing the actions 601-604 in the information providing device 110 may enable scheduling of an information transmission in a server 130, when being loaded into the one or more processing circuits 720.

The computer program product mentioned above may be provided for instance in the form of a data carrier carrying computer program code for performing at least some of the actions 601-604 according to some embodiments when being loaded into the processing circuit 720. The data carrier may be e.g. a hard disk, a CD ROM disc, a memory stick, an optical storage device, a magnetic storage device or any other appropriate medium such as a disk or tape that may hold machine readable data. The computer program product may furthermore be provided as computer program code on a server and downloaded to the information providing device 110 remotely, e.g. over an Internet or an intranet connection.

Some Particular Embodiments

Some alternative non-limiting exemplary embodiments will now be described.

According to some embodiments, the object is achieved by a method in an application server 130 for time scheduling of an information transmission from an information providing device 110 to an information subscriber 140. The application server 130, the information providing device 110 and the information subscriber 140 are comprised in a communication system 100. The method comprises determining the moment in time when the information subscriber 140 desires information. Also, an estimation of the communication intensity in the communication system 100 at the determined moment in time is obtained. If the estimated communication intensity exceeds a certain threshold value, an appropriate time period for the information providing device 110 to send the desired information to the information subscriber 140 is calculated, based on the wireless communication intensity in the communication system 100. Furthermore, a trigger signal is sent to the information providing device 110, instructing the information providing device 110 at what time period to transmit information to the information subscriber 140.

According to some embodiments of the method according to the first aspect, the action of calculating an appropriate time period may be further based on the determined moment in time when the information subscriber 140 desires information.

According to some embodiments of the method according to the first aspect, the action of calculating an appropriate time period may be further based on the limitations of the communication system 100.

According to some embodiments of the method according to the first aspect, the action of calculating an appropriate time period may be further based on an obtained priority level of the information providing device 110 and/or the information subscriber 140.

According to some embodiments of the method according to the first aspect, the action of calculating an appropriate time period may be further based on an estimation of the data size of the information to be transmitted.

According to some embodiments of the method according to the first aspect, the method may comprise the further action of determining the need for a message exchange prior to the information transmission, and/or the time to execute this prior information transmission message exchange.

According to some embodiments of the method according to the first aspect, the method may comprise the further action of determining the location and/or registration of the information providing device 110.

According to some embodiments of the method according to the first aspect, the method may comprise the further action of obtaining information concerning the communication method used by the information providing device 110 for transmitting the information.

According to some embodiments of the method according to the first aspect, the estimation of the communication intensity in the communication system 100 at the determined moment in time may be based on the number of information transmissions within the communication system 100 and/or measurements and/or a traffic model for the traffic load within the communication system 100.

According to a second aspect, the object is achieved by an arrangement in an application server 130 for time scheduling of an information transmission from an information providing device 110 to an information subscriber 140. The application server 130, the information providing device and the information subscriber 140 are comprised in a communication system 100. The arrangement comprises a determination unit, configured for determining the moment in time when the information subscriber 140 desires information. Also, the arrangement comprises an obtaining unit. The obtaining unit is configured for obtaining an estimation of the communication intensity in the communication system 100 at the determined moment in time. Furthermore, the arrangement comprises a comparison unit, configured to establish if the estimated communication intensity exceeds a certain threshold value. In addition the arrangement comprises a calculating unit. The calculating unit is configured to calculate an appropriate time period for the information providing device to send the desired information to the information subscriber 140, based on the communication intensity in the communication system 100. Also, in further addition, the arrangement comprises a sender. The sender is configured to send a trigger signal to the information providing device 110, instructing the information providing device 110 at what time period to transmit information to the information subscriber 140.

According to a third aspect, the object is achieved by a method in an information providing device 110 for enabling time scheduling of an information transmission in an application server 130. The information transmission is performed from the information providing device 110 to an information subscriber 140. The information providing device 110, the application server 130 and the information subscriber 140 are comprised in a communication system 100. The method comprises receiving a trigger signal from the application server 130. The trigger signal comprises instructions concerning at what time period to transmit information to the information subscriber 140. Also, the method comprises transmitting information data to the information subscriber 140.

According to some embodiments of the method according to the third aspect, the method further may comprise the action of providing presence information to the application server 130, which presence information may comprise e.g. type of information data to send, radio access technology used, type of information providing device, priority level of information and/or of the information providing device 110.

According to a fourth aspect, the object is achieved by an arrangement in an information providing device 110 for enabling time scheduling of an information transmission in an application server 130. The information transmission is performed from the information providing device 110 to an information subscriber 140. The information providing device 110, the application server 130 and the information subscriber 140 are comprised in a communication system 100. The arrangement comprises a receiver. The receiver is configured to receive a trigger signal from the information providing device 110, comprising instructions concerning at what time period to transmit information to the information subscriber 140. Also, the arrangement comprises a transmitter. The transmitter is configured to transmit information data to the information subscriber 140.

When using the formulation "comprise" or "comprising" within the present context, it is to be interpreted as nonlimiting, i.e. meaning "consist at least of". The present methods and devices are not limited to the above described preferred embodiments. Various alternatives, modifications and equivalents may be used. Therefore, the above embodiments are not to be taken as limiting the scope of claimed protection, which instead is to be defined by the appending claims.

What is claimed is:

1. A method in a server for scheduling data to be transmitted from a plurality of information providing devices in a geographical area to a subscriber equipment, wherein the server, the information providing devices, and the subscriber equipment are comprised in a communication system, the method comprising:
   determining two or more input parameters, including a time when the subscriber equipment desires the data from the information providing devices as well as one or more of:
      a radio access technology utilized by the information providing devices;
      the number of the information providing devices within the geographical area;
      when the information providing devices are due to deliver data to the subscriber equipment;
      a traffic model or measurement for human usage in the geographical area; and
      an estimated load within the communication system; and
   scheduling the information providing devices to provide data to the subscriber equipment at different times, based on the two or more determined input parameters;
   wherein the information providing devices are machine-to-machine (M2M) devices, and the data from any given one of the M2M devices pertains to measurement data collected by that M2M device.

2. The method according to claim 1, wherein the scheduling is further based on an obtained priority value of the information providing devices, the subscriber equipment, or the data.

3. The method according to claim 1, further comprising obtaining registration information related to the information providing devices, wherein the registration information related to any given one of the information providing devices comprises at least one of a location of the information providing device, the radio access technology used by the information providing device, and information data related to the information providing device, and wherein the scheduling is further based on said registration information.

4. The method according to claim 1, further comprising obtaining registration information related to the subscriber equipment, said registration information comprising at least one of a location of the subscriber equipment, the communication technology used by the subscriber equipment, a traffic load in the part of the communication system that subscriber equipment has access to, and information data related to the subscriber equipment, and wherein the scheduling is further based on said registration information.

5. The method according to claim 1, wherein the scheduling is further based on an estimation of a size of data to be provided from different ones of the information providing devices.

6. The method according to claim 1, wherein said scheduling comprises scheduling the different ones of the information providing devices to transmit the data from those information providing devices at the different times, and further comprising requesting the different ones of the information providing devices to transmit the data at respective times.

7. The method according to claim 1, further comprising receiving the data from the different ones of the information providing devices, and wherein said scheduling comprises scheduling the data received from the different ones of the information providing devices to be transmitted from the server to the subscriber equipment at the different times.

8. A server configured to schedule data to be transmitted from a plurality of information providing devices in a geographical area to a subscriber equipment, wherein the server, the information providing devices, and the subscriber equipment are comprised in a communication system, the server comprising a scheduling circuit configured to:
   determine two or more input parameters, including a time when the subscriber equipment desires the data from the information providing devices as well as one or more of:
      a radio access technology utilized by the information providing devices;
      the number of the information providing devices within the geographical area;
      when the information providing devices are due to deliver data to the subscriber equipment;
      a traffic model or measurement for human usage in the geographical area; and
      an estimated load within the communication system; and
   schedule the information providing devices to provide data to the subscriber equipment at different times, based on the two or more determined input parameters;
   wherein the information providing devices are machine-to-machine (M2M) devices, and the data from any given one of the M2M devices pertains to measurement data collected by that M2M device.

9. The server according to claim 8, wherein the scheduling is further based on an obtained priority value of the information providing devices, the subscriber equipment, or the data.

10. The server according to claim 8, wherein the scheduling circuit is further configured to obtain registration information related to the information providing devices, wherein the registration information related to any given one of the information providing devices comprises at least one of a location of the information providing device, the radio access technology used by the information providing device, and information data related to the information providing device, and to further base the scheduling on said registration information.

11. The server according to claim 8, wherein the scheduling circuit is further configured to obtain registration information related to the subscriber equipment, said registration information comprising at least one of a location of the subscriber equipment, the communication technology used by the subscriber equipment, a traffic load in the part of the communication system that the subscriber equipment has access to, and information data related to the subscriber equipment, and to further base the scheduling on said registration information.

12. The server according to claim 8, wherein the scheduling is further based on an estimation of a size of data to be provided from different ones of the information providing devices.

13. The server according to claim 8, wherein said scheduling circuit is configured to schedule the different ones of the information providing devices to transmit the data from those information providing devices at the different times, and to request the different ones of the information providing devices to transmit the data at respective times.

14. The server according to claim 8, wherein the server is configured to receive the data from the different ones of the information providing devices, and wherein the scheduling circuit is configured to schedule the data received from the different ones of the information providing devices to be transmitted from the server to the subscriber equipment at the different times.

15. A computer program product stored on a non-transitory computer readable medium and comprising computer program instructions that, when executed by a scheduling circuit of a server, cause the server to schedule data to be transmitted from a plurality of information providing devices in a geographical area to a subscriber equipment, wherein the server, the information providing devices, and the subscriber equipment are comprised in a communication system, wherein the computer program instructions cause the server to:

determine two or more input parameters, including a time when the subscriber equipment desires the data from the information providing devices as well as one or more of:
  a radio access technology utilized by the information providing devices;
  the number of the information providing devices within the geographical area;
  when the information providing devices are due to deliver data to the subscriber equipment;
  a traffic model or measurement for human usage in the geographical area; and
  an estimated load within the communication system; and
schedule the information providing devices to provide data to the subscriber equipment at different times, based on the two or more determined input parameters;
wherein the information providing devices are machine-to-machine (M2M) devices, and the data from any given one of the M2M devices pertains to measurement data collected by that M2M device.

* * * * *